US008214431B2

(12) United States Patent
Miyajima et al.

(10) Patent No.: US 8,214,431 B2
(45) Date of Patent: Jul. 3, 2012

(54) CONTENT AND PLAYLIST PROVIDING METHOD

(75) Inventors: Yasushi Miyajima, Kanagawa (JP); Kosei Yamashita, Kanagawa (JP); Yoichiro Sako, Tokyo (JP); Toshiro Terauchi, Tokyo (JP); Makoto Inoue, Tokyo (JP); Masamichi Asukai, Kanagawa (JP); Mitsuru Takehara, Tokyo (JP); Takatoshi Nakamura, Kanagawa (JP); Toru Sasaki, Tokyo (JP); Masafumi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 834 days.

(21) Appl. No.: 11/393,601

(22) Filed: Mar. 30, 2006

(65) Prior Publication Data

US 2006/0293909 A1 Dec. 28, 2006

(30) Foreign Application Priority Data

Apr. 1, 2005 (JP) ................................ 2005-105699

(51) Int. Cl.
*G06F 15/16* (2006.01)

(52) U.S. Cl. ......................... 709/204; 709/201; 709/205

(58) Field of Classification Search .................. 709/204; 715/758

See application file for complete search history.

(56) References Cited

U.S. PATENT DOCUMENTS

| | | | | |
|---|---|---|---|---|
| 4,958,929 | A | 9/1990 | Kondo | |
| 5,424,535 | A | 6/1995 | Albion et al. | |
| 6,754,904 | B1 * | 6/2004 | Cooper et al. | 725/32 |
| 7,797,446 | B2 * | 9/2010 | Heller et al. | 709/242 |
| 2003/0225834 | A1 | 12/2003 | Lee et al. | |
| 2003/0227478 | A1 * | 12/2003 | Chatfield | 345/751 |
| 2004/0137882 | A1 * | 7/2004 | Forsyth | 455/414.1 |
| 2006/0195521 | A1 * | 8/2006 | New et al. | 709/204 |

FOREIGN PATENT DOCUMENTS

| | | | |
|---|---|---|---|
| EP | 0311144 | A2 | 4/1989 |
| EP | 0793079 | A2 | 9/1997 |
| EP | 1435510 | A1 | 7/2004 |
| JP | 4-324316 | | 11/1993 |
| JP | 2000-048046 | A | 2/2000 |

(Continued)

OTHER PUBLICATIONS

Keys, "Software Development Enviornment, Music Softwar for mobile phones, Automatice production of a playlist", Nikkei Electronics, Dec. 20, 2004, No. 889, p. 51, Japan Nikkei.

(Continued)

*Primary Examiner* — Dohm Chankong
*Assistant Examiner* — Neeraj Utreja
(74) *Attorney, Agent, or Firm* — Wolf, Greenfield & Sacks, P.C.

(57) ABSTRACT

A content providing method includes the steps of preparing, on a network, a bulletin board server that provides an electronic bulletin board and a content server that accommodates content; enabling, by the bulletin board server, a second user to make a post on a topic when a first user introduces the topic under a predetermined title on the electronic bulletin board; outputting, by the bulletin board server, a list indicating recommended content as a playlist to an apparatus of a user who accesses via the network when the second user posts information on the recommended content that suits the title in the topic; and outputting, by the content server, designated content to the apparatus of the user to which the playlist is output when the content included in the playlist is designated.

16 Claims, 8 Drawing Sheets

FOREIGN PATENT DOCUMENTS

| | | | |
|---|---|---|---|
| JP | 2002-132674 | A | 5/2002 |
| JP | 2002-207736 | A | 7/2002 |
| JP | 2002-236774 | A | 8/2002 |
| JP | 2002-333892 | A | 11/2002 |
| JP | 2003-015662 | A | 1/2003 |
| JP | 2004-030327 | A | 1/2004 |
| JP | 2004-061709 | A | 2/2004 |
| JP | 2004-208944 | A | 7/2004 |
| WO | WO 00/57228 | | 9/2000 |

OTHER PUBLICATIONS

Jing et al., Design and implementation of multimedia bulletin board system. Computer Engineering and Applications 2004;40(17):124-8.

* cited by examiner

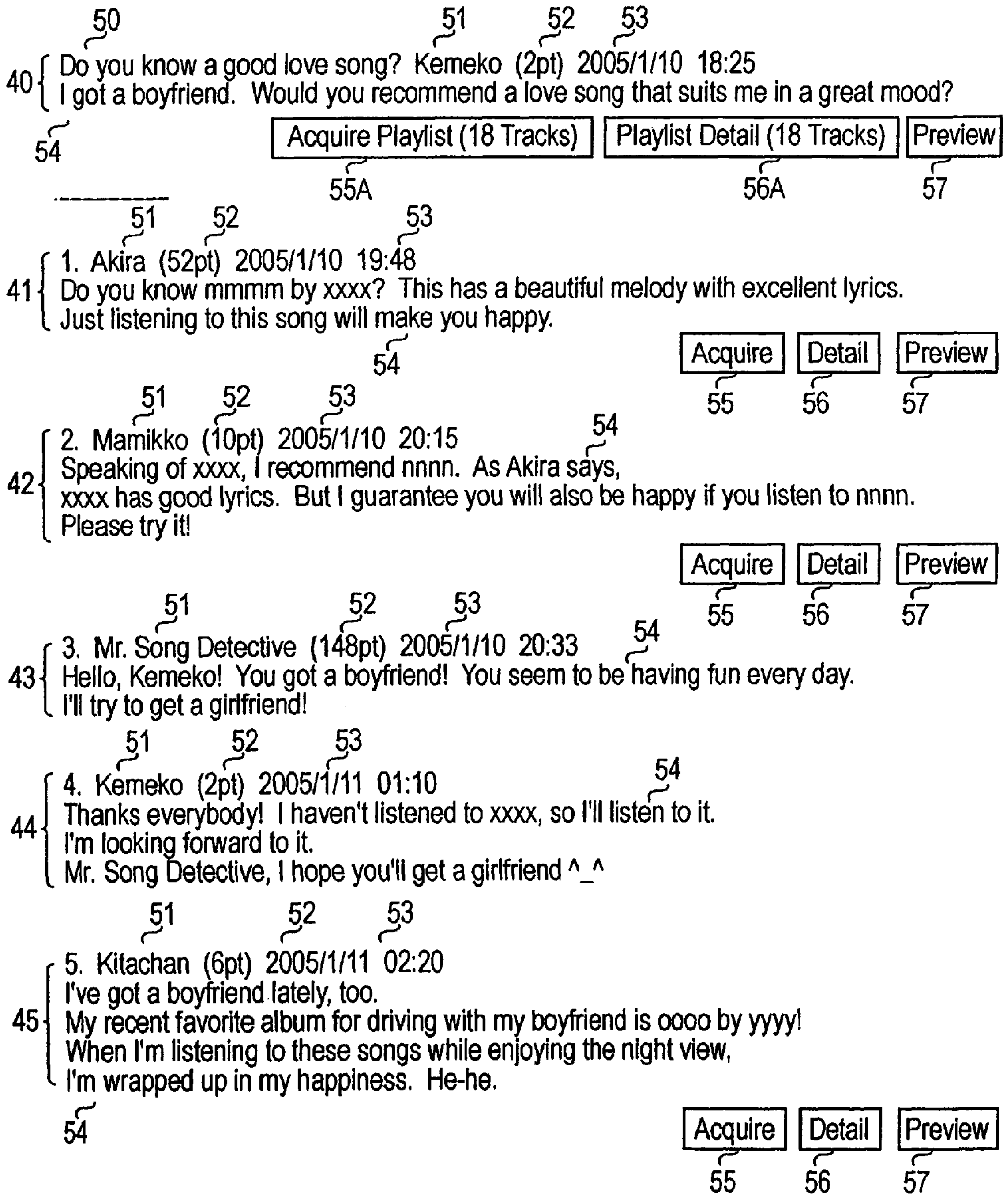

FIG. 2

40 { Do you know a good love song? Kemeko (2pt) 2005/1/10 18:25
   { I got a boyfriend. Would you recommend a love song that suits me in a great mood?

54

[Acquire Playlist (18 Tracks)] [Playlist Detail (18 Tracks)] [Preview]
         55A                          56A                    57

41 { 1. Akira (52pt) 2005/1/10 19:48
   { Do you know mmmm by xxxx? This has a beautiful melody with excellent lyrics.
   { Just listening to this song will make you happy.

54

[Acquire] [Detail] [Preview]
   55       56       57

42 { 2. Mamikko (10pt) 2005/1/10 20:15
   { Speaking of xxxx, I recommend nnnn. As Akira says,
   { xxxx has good lyrics. But I guarantee you will also be happy if you listen to nnnn.
   { Please try it!

[Acquire] [Detail] [Preview]
   55       56       57

43 { 3. Mr. Song Detective (148pt) 2005/1/10 20:33
   { Hello, Kemeko! You got a boyfriend! You seem to be having fun every day.
   { I'll try to get a girlfriend!

44 { 4. Kemeko (2pt) 2005/1/11 01:10
   { Thanks everybody! I haven't listened to xxxx, so I'll listen to it.
   { I'm looking forward to it.
   { Mr. Song Detective, I hope you'll get a girlfriend ^_^

45 { 5. Kitachan (6pt) 2005/1/11 02:20
   { I've got a boyfriend lately, too.
   { My recent favorite album for driving with my boyfriend is oooo by yyyy!
   { When I'm listening to these songs while enjoying the night view,
   { I'm wrapped up in my happiness. He-he.

54

[Acquire] [Detail] [Preview]
   55       56       57

FIG. 6

```
<topic>
    <title>Do you know a good love song?</title>
    <comment>
        <name>Kemeko</name>
        <eva>(2pt)</eva>
        <date>2005/1/10  18:25</date>
        <body>I got a boyfriend.  Would you recommend a love song that suits me
in such a great mood?
    </body>
    </comment>
</topic>

<playlist>
    <rating>3</rating>
    <comment>
        <recommend>http://xxxx.co.jp/yyyyy/hhh.php?id=08360</recommend>
        <name>Akira</name>
        <eva>(52pt)</eva>
        <date>2005/1/10  19:18</date>
        <body>Do you know mmmm by xxxx?  This has a beautiful melody
with excellent lyrics.  Just listening to this song will make you happy.</body>
    </comment>
    <comment>
        <recommend>http://xxxx.co.jp/yyyyy/hhh.php?id=68425</recommend>
        <name>Mamikko</name>
        <eva>(10pt)</eva>
        <date>2005/1/10  20:15</date>
        <body>Speaking of xxxx, I recommend nnnn.
As Akira says, xxxx has good lyrics.  But I guarantee you will also be happy
if you listen to nnnn.  Please try it!</body>
    </comment>
    <comment>
    <name>Mr. Song Detective</name>
        <eva>(148pt)</eva>
        <date>2005/1/10  20:33</date>
        <body>Hello, Kemeko!  You got a boyfriend!  You seem to be having fun every day.
I'll try to get a girlfriend!</body>

    </comment>

    . . . .

</playlist>
```

CONTENT AND PLAYLIST PROVIDING METHOD

CROSS REFERENCES TO RELATED APPLICATIONS

The present invention contains subject matter related to Japanese Patent Application JP 2005-105699 filed in the Japanese Patent Office on Apr. 1, 2005, the entire contents of which are incorporated herein by reference.

BACKGROUND OF THE INVENTION

1. Field of the Invention

The present invention relates to a method for providing content, such as a music track, and to a method for providing a playlist of the content.

2. Description of the Related Art

Music players containing a mass storage device, such as a hard disk device or a nonvolatile memory, are becoming commonplace. Such playback apparatuses are capable of accommodating or storing a huge number of music tracks, such as thousands to tens of thousands of music tracks.

For example, for a hard disk device having a capacity of 100 gigabytes, when each music track is three minutes long, 3,000 or more music tracks can be stored. In addition, if digital audio data of a music track is encoded in accordance with an encoding method, such as MP3 (MPEG-1/Audio Layer 3) or ATRAC™ (Adaptive TRansform Acoustic Coding), the amount of data can be compressed to one-tenth to one-twelfth of the original amount of data. Thus, 30,000 or more music tracks can be stored.

Thus, users of such music players are able to keep music tracks close to them or able to carry music tracks with them. Such users are able to listen to a favorite music track from among the music tracks.

However, when a large number of music tracks are stored in a playback apparatus, as described above, it is difficult for a user to find a particular music track from among the large number of music tracks. In addition, it often happens that the user does not remember what music tracks are stored unless all the titles of the stored music tracks are displayed. Furthermore, since there are many music tracks that the user does not know and many music tracks are released every day, even if the number of music tracks that the user can carry with him or her increases, storing all the music tracks and remembering all the stored music tracks is very difficult.

Methods for preparing a playlist are considered. In these methods, a playlist is a list of titles of music tracks selected by a user's preference. For example, a user collects titles of music tracks that the user wants to listen to when driving along the coast, and a list of the collected titles functions as a playlist. Thus, the user is able to listen to a music track that suits the mood and condition of the user at that time by performing music selection in accordance with such a playlist.

In addition, if such playlists are capable of being exchanged between friends and being browsed by the friends, such exchange and browse can help selection of a music track. Thus, users are able to easily select a music track that they want to listen to.

In addition, if a community is formed by members having similar preferences and information is exchanged between the members, a member receives the benefit of having a wide range of preferences given by other members.

Known technologies are described, for example, in Japanese Unexamined Patent Application Publication Nos. 2004-13653 and 2004-46575.

SUMMARY OF THE INVENTION

However, in practice, it is very difficult for a user to create a playlist every time by himself or herself so as to be suitable for the mood and condition at that time. In addition, such a playlist includes only music tracks that the user owns, and a new music track is not included in the playlist.

In addition, even if such a playlist created by the user is shared with others, since they can only browse the playlist, the user's preference and taste are just introduced to them. Thus, preference and condition of a person who is browsing the playlist is not taken into consideration.

Accordingly, it is desirable to provide a condition in which a music track that suits a user's preference can be easily selected and in which the user is able to exchange information on a recommended music track with another user and to allow the users to enjoy communication in human relationships.

A playlist providing method according to an embodiment of the present invention includes the steps of enabling a second user to make a post on a topic when a first user introduces the topic under a predetermined title on an electronic bulletin board; and outputting a list indicating recommended content as a playlist via a network when the second user posts information on the recommended content that suits the title in the topic.

Accordingly, a music track that suits the mood and condition of a user is registered in a playlist even if the user does not know the music track. In addition, since the contents of the playlist change with time in accordance with the contents of a topic, the user does not lose interest in the playlist.

BRIEF DESCRIPTION OF THE DRAWINGS

FIG. 2 shows a display example of a topic;

FIG. 6 shows a description example of the playlist;

DESCRIPTION OF THE PREFERRED EMBODIMENTS

Terms used in the following description and the outline of an embodiment of the present invention are described first.

In the following description, the term "music track" or "music" includes information represented using sound, such as reading of poems and stories, dramatic performance including comic story telling and comic acts, and running commentary for speeches, news, and sports, as well as general music.

In the following description, in principle, some terms have the meanings as described below.

The term "electronic bulletin board" or "bulletin board" means an electronic bulletin board system in which a terminal is capable of posting and browsing a message via a network.

The term "topic" means a sequence of posts on a bulletin board arranged in a predetermined order. A topic is also called a "thread". The topic is displayed on a terminal as the contents of the electronic bulletin board. A plurality of topics is capable of being dealt with in a bulletin board. Generally, making the first post is called "introducing a topic".

The term "playlist" means a list of titles of music tracks arranged according to a predetermined rule. The playlist may include information such as an artist name, which is associated with a music track.

In this embodiment, a playlist is created using an electronic bulletin board system, as described below.

A) A user A introduces a topic on a bulletin board on the Internet. In other words, the user A posts, in the topic, a message on the subject of, for example, the mood and condition of the user A, the tone of music that the user A wants to listen to, and the like.

B) Users B, C, and so on post recommended music tracks suitable for the subject in the topic. Alternatively, the users B, C, and so on may post comments on the topic.

C) The topic can be downloaded as a playlist to terminals of the users A, B, C, and so on. The topic is open to users who do not make a post.

Figure 1:
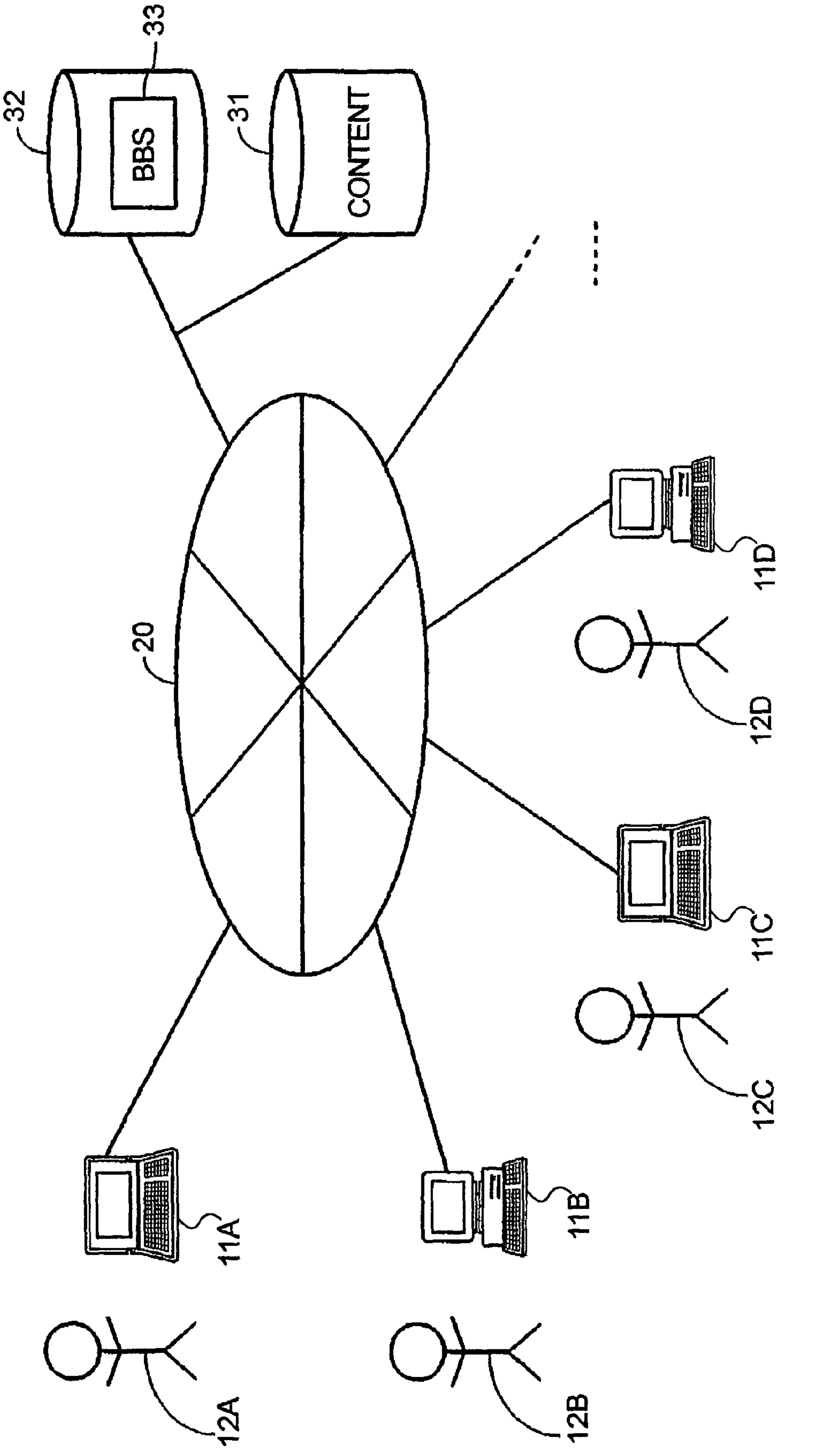
FIG. 1 is a schematic diagram showing the structure of the entire system according to an embodiment of the present invention.

FIG. 1 schematically shows an example of the entire system according to this embodiment. In this example, personal computers 11 (11A, 11B, and so on) are used as music playback terminals. The personal computers 11 are connected to the Internet 20. A content server 31 and a bulletin board server 32 are connected to the Internet 20.

The content server 31 provides music tracks. Many music tracks are stored as digital audio data in the content server 31. The content server 31 also contains information on the stored music tracks, such as titles, as a database. In this example, digital audio data stored in the content server 31 is encoded, for example, by the MP3 method for data compression.

The bulletin board server 32 provides an electronic bulletin board 33. Users of the personal computers 11 are capable of browsing the electronic bulletin board 33 and posting messages on the electronic bulletin board 33. A plurality of topics is formed on the electronic bulletin board 33, and each of the topics is accessed by a plurality of users. The users are roughly categorized into four types, that is, (1) a topic owner, (2) a music recommender, (3) a comment contributor, and (4) a bulletin board browser.

The "topic owner" is a user who posts a subject on the electronic bulletin board 33 to introduce a topic. In other words, when the topic owner makes the first post, the topic is formed. There is only one topic owner for the topic. In the example shown in FIG. 1, a user who uses the computer 11A is a topic owner 12A.

The "music recommender" is a user who recommends a music track suitable for the content of the topic. A playlist including the title of the recommended music track is downloaded to a playback terminal. There may be a music recommender or a plurality of music recommenders for the topic. In the example shown in FIG. 1, a user who uses the personal computer 11B is a music recommender 12B.

The "comment contributor" is a user who does not recommend a music track but who posts a comment. There may be a comment contributor or a plurality of comment contributors for the topic. In the example shown in FIG. 1, a user who uses the personal computer 11C is a comment contributor 12C.

The "bulletin board browser" is a user who only browses the topic and downloads the playlist without recommending a music track or posting a comment. There may be a bulletin board browser or a plurality of bulletin board browsers for the topic. In the example shown in FIG. 1, a user who uses the personal computer 11D is a bulletin board browser 12D.

A user of the electronic bulletin board 33 plays a different role, from among a topic owner, a music recommender, a comment contributor, and a bulletin board browser, depending on a case. For example, a music recommender in a case may serve as a topic owner or a comment contributor in a different case.

When a topic is introduced, if the music recommender 12B or the comment contributor 12C makes a post, the contents of the electronic bulletin board 33 are updated. In accordance with increases in the number of recommended music tracks and the number of comments with the lapse of time, a playlist dynamically changes.

A display example of a topic (contents of the electronic bulletin board 33) is described next.

When a personal computer 11 is connected to the bulletin board server 32 and selects a topic on the electronic bulletin board 33, the selected topic is displayed on the display of the personal computers 11, for example, as shown in FIG. 2.

In the topic, posts are added from top to down in accordance with posting. In the example shown in FIG. 2, posts 40 to 45 are made in that order. In this case, the topic owner 12A introduces the topic under the title "Do you know a good love song?".

In other words, the first post 40 is made by the topic owner 12A, and the following posts 41 to 45 are made by music recommenders 12B and comment contributors 12C (and the topic owner 12A) for the subject and content brought by the post 40.

The posts 40 to 45 each include a user name 51, a rating 52, posted date and time 53, and a comment 54. The post 40 also includes a title 50. The title 50, the user name 51, the rating 52, the posted date and time 53, and the comment 54 have the meanings described below.

The title 50 is provided only to the head of the post 40 made by the topic owner 12A. The title 50 indicates a heading brought by the topic owner 12A.

The user name 51 indicates the name (or handle name) of a user who makes a post.

The rating 52 indicates a numerical value representing a rating for the user who makes the post. It is not uncommon that malicious defamation and slander are committed on an electronic bulletin board on the Internet. In order to avoid this, others evaluate a user who makes a post, and an evaluation result is obtained as the rating 52. All users can browse the rating 52.

For example, the rating 52 indicates a score calculated from the number of recommended music tracks, the number of downloads of each recommended music track, direct evaluation by other users, and the like. Alternatively, the rating 52 is acquired based on a procedure adopted in auction services on the Internet or the like. When a topic is displayed, only a post with a rating of a predetermined value or more may be displayed. Thus, a post made by a music recommender or a comment contributor with a low rating is not displayed. A post that is not displayed is not reflected in a playlist.

The posted date and time 53 indicates the date and time when the post is made (or registered).

The comment 54 is a comment contributed by the user who has the user name 51 for the subject and content of the post 40. The comment 54 serves as text in the post. Generally, the title of a recommended music track, an impression for the music track, and the like are included in the comment 54.

In the example shown in FIG. 2, the posts 41, 42, and 45 are made by different music recommenders 12B. The posts 41, 42, and 45 each include a recommended music track. The posts 43 and 44 are made by a comment contributor 12C and the topic owner 12A, respectively. The posts 43 and 44 do not include a recommended music track.

Thus, a "acquire playlist" button 55A, a "playlist detail" button 56A, and a "preview" button 57 are displayed for the first post 40 made by the topic owner 12A. An "acquire" button 55, a "detail" button 56, and the "preview" button 57 are displayed for the posts 41, 42, and 45 each including the title of a recommended music track. If a corresponding music track has already been purchased, the "preview" button 57 is displayed as a "playback" button 57.

The above-mentioned operation buttons are used for the purposes described below.

When the "acquire playlist" button 55A is operated, the playlist is downloaded from the content server 31 to the personal computer 11. This downloading processing can be performed even if a music track included in the playlist is not purchased.

As described later, when playback is performed using the playlist, music tracks for preview (normally, only a part of each music track) are played back, and then, each music track can be purchased by an operation of a personal computer. The number of music tracks included in the playlist is indicated on the "acquire playlist" button 55A. In the example shown in FIG. 2, the "acquire playlist" button 55A represents that the playlist includes eighteen music tracks.

When the title of a purchased (paid) music track is selected from among the titles included in the playlist and the "acquire" button 55 is operated, digital audio data of the selected music track is downloaded from the content server 31 to the personal computer 11.

When the "playlist detail" button 56A is operated, the corresponding playlist is downloaded from the bulletin board server 32, and the contents of the playlist are displayed. When the "detail" button 56 is operated, data of a music track included in a post for which the "detail" button 56 is displayed is downloaded from the bulletin board server 32, and the contents are displayed.

Contents to be displayed when the "playlist detail" button 56A or the "detail" button 56 is operated will be described later. The number of music tracks included in the corresponding playlist is indicated on the "playlist detail" button 56A. In the example shown in FIG. 2, the "playlist detail" button 56A represents that the playlist includes eighteen music tracks.

When the "preview" button 57 for a music track that is not purchased from among music tracks included in the playlist is operated, part of digital audio data of the music track is provided in a streaming method from the content server 31 to the personal computer 11. Accordingly, the music track can be previewed. When the "playback" button 57 for a purchased music track is operated, the music track, which is contained in the personal computer 11, can be played back.

When a music track is selected without using a playlist, similar processing can be achieved. In addition, a plurality of topics on the electronic bulletin board 33 may be hierarchically arranged and displayed with a tree structure.

An example of a display screen displayed when the "playlist detail" button 56A is operated is described next.

When the "playlist detail" button 56A for the topic shown in FIG. 2 is operated, the topic is shaped to create a playlist. The created playlist is downloaded to the personal computer 11, and displayed on the personal computer 11.

Figure 3:
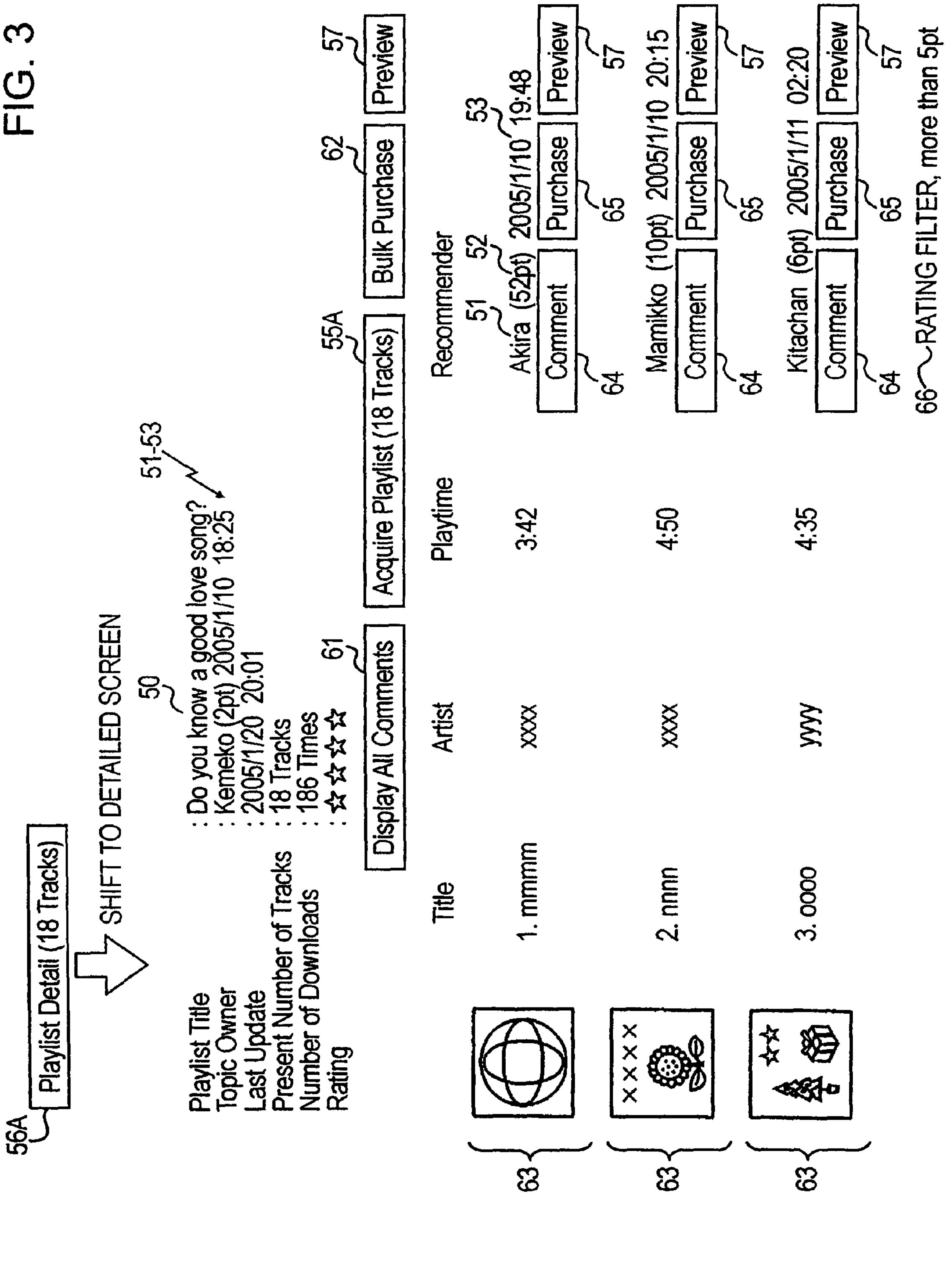
FIG. 3 shows a display example of a playlist.

FIG. 3 shows a display example of the playlist. The contents of the playlist are displayed as described below. FIG. 3 shows a case where three music tracks are recommended for the topic shown in FIG. 2.

A "playlist title" field indicates the subject of the playlist. The playlist title is identical to the title 50 of the post 40. A user of the personal computer 11 may change the playlist title.

A "topic owner" field indicates the user name 51, the rating 52, and the posted date and time 53 for the post 40. Thus, the "topic owner" field indicates the name of the topic owner 12A who introduces the topic, the rating for the topic owner 12A, and the date and time when the topic is introduced.

A "last update" field indicates the date and time when the last post is made by the topic owner 12A, the music recommender 12B, or the comment contributor 12C.

A "present number of tracks" field indicates the number of recommended music tracks provided by the music recommender 12B for the topic. The present number of music tracks may increase as long as the topic exists. A case where the topic is deleted will be described later.

A "number of downloads" field indicates the number of downloads of the playlist.

A "rating" field indicates, by the number of stars, the rating for the playlist provided by the present user.

When a "display all comments" button 61 is operated, the contents (all the posts) of the topic for which the playlist is created are displayed, for example, as shown in FIG. 2. Thus, all the posts can be browsed. All the comments may be displayed in a different way.

When a "bulk purchase" button 62 is operated, a mode in which unpurchased music tracks included in the playlist are purchased altogether is set.

Music track information 63 is information on a music track included in the topic for which the playlist is created. The music track information 63 is displayed for each music track and includes basic information about the music track, such as a picture of an album jacket, a title, an artist name, and a playtime. In addition, the music track information 63 includes the user name 51 of a music recommender, the rating 52 for the music recommender, and the posted date and time 53 (that is, the date and time when the recommendation is made).

In addition, a "comment" button 64 for reading the posted comment 54, the "preview" button 57, and a "purchase" button 65 are also displayed. When the "preview" button 57 is operated, the music track for which the "preview" button 57 is displayed can be previewed. After the music track is previewed, when the "purchase" button 65 is operated in order to purchase the music track, digital audio data of the music track is downloaded from the content server 31 to the personal computer 11. Thus, when the "purchase" button 65 is operated, each music track can be purchased.

A rating filter 66 is a filter for displaying the music track information 63 whose rating 52 indicating the rating for a music recommender is more than a predetermined value. FIG. 3 shows a case where the music track information 63 provided by the music recommender 12B whose rating is more than five is displayed.

By setting the rating filter 66, a music track recommended by a music recommender with a low rating is not included in the playlist. In order to avoid so-called trolling or harassment, an ignore list may be created in order to exclude recommendation from a particular person, and filtering may be performed using the ignore list.

An example of a display screen displayed when the "detail" button 56 is operated is described next.

When the "detail" button 56 provided for the post 41, 42, or 45 shown in FIG. 2 is operated, the details of a music track included in the corresponding post 41, 42, or 45 for which the "detail" button 56 is provided are displayed.

Figure 4:
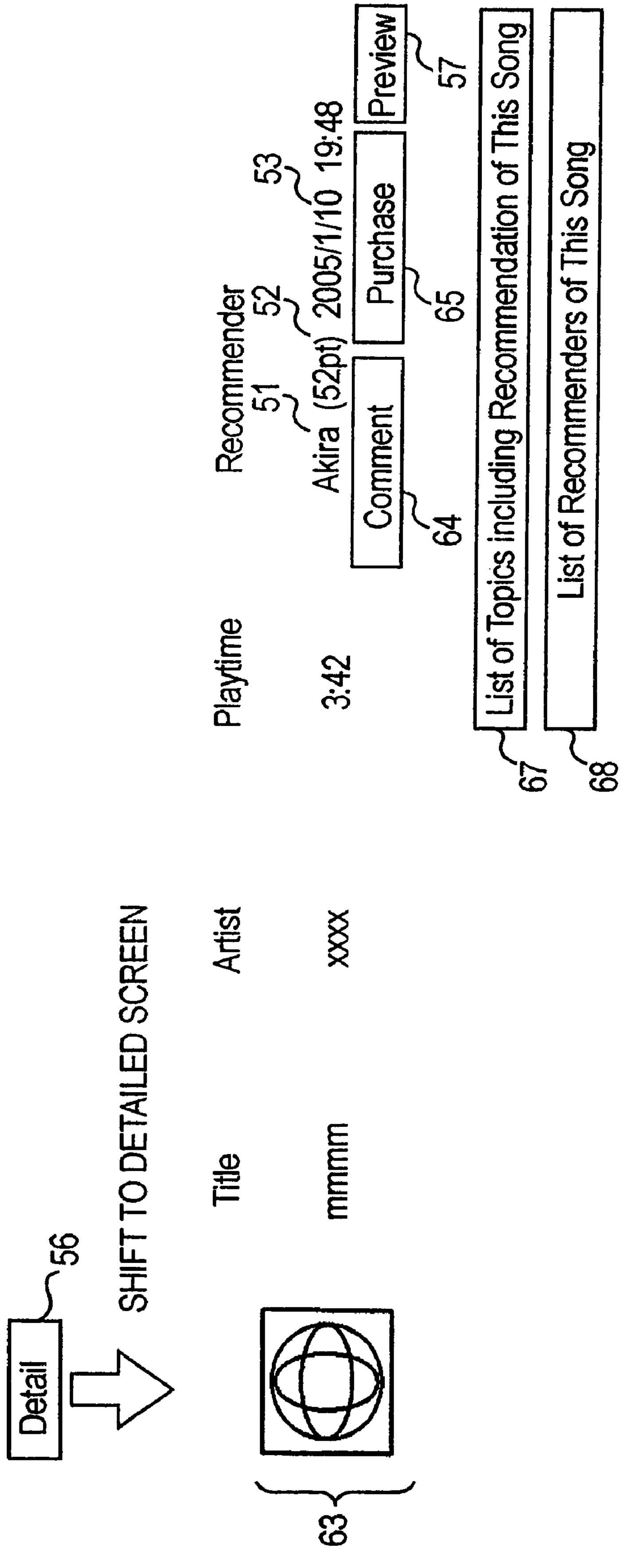
FIG. 4 shows a display example of a recommended music track.

FIG. 4 shows a display example of the corresponding music track. The music track information 63 on the corresponding music track is displayed as shown in FIG. 3, and a "list of topics including recommendation of this song" button 67 and a "list of recommenders of this song" button 68 are displayed.

The "list of topics including recommendation of this song" button 67 is used for displaying a list of topics in which the corresponding music track is also recommended. If the same music track is recommended in another topic, the other topic is likely to be related to this topic. Thus, other music tracks recommended in the other topics are likely to be highly related to this topic.

When the "list of recommenders of this song" button 68 is operated, a list of users who recommend the corresponding music track is displayed, irrespective of a topic. Thus, other music tracks recommended by a user who recommends the corresponding music track can be known. For example, whether or not the recommender who recommends the corresponding music track has a preference for rock music or whether or not the recommender who recommends the corresponding music track has no particular preference can be known. In addition, comments for different music tracks can be compared with each other. Thus, efficient information for deciding whether or not to purchase the recommended music track can be acquired.

A display example and an operation procedure for recommending a music track are described next.

Figure 5:
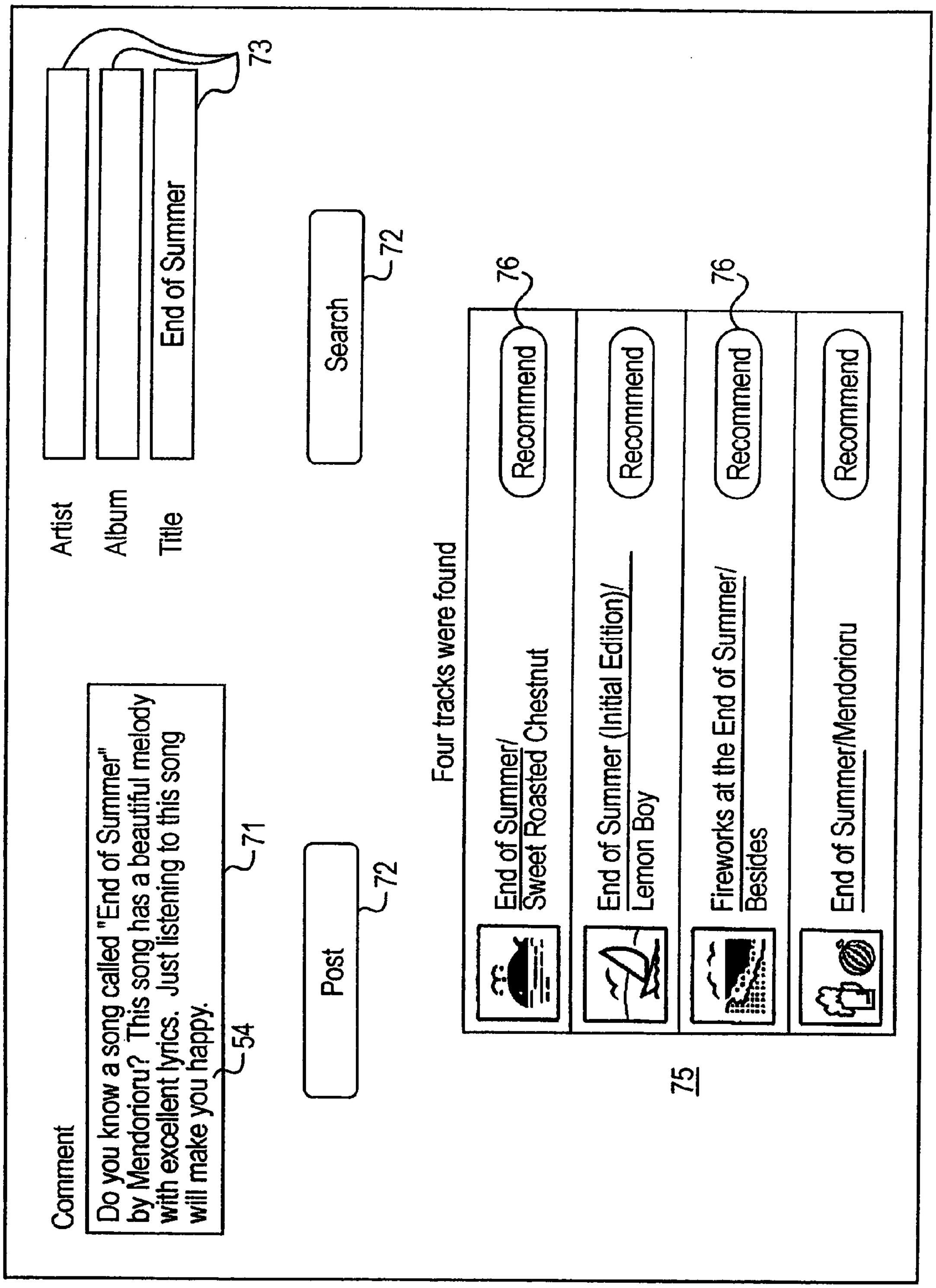
FIG. 5 shows a display example when a recommended music track is entered.

FIG. 5 shows an example of a display screen used when a user (music recommender 12B) recommends a music track. When a "recommend music" button or an "entry comment" button displayed on the display screen for the topic, for example, shown in FIG. 2 is operated, the display screen for recommending a music track is displayed.

On the screen shown in FIG. 5, the music recommender 12B enters a comment in an entry field 71, and operates a "post" button 72. Then, the entered comment 54 is added to the topic as a new post.

Then, the music recommender 12B enters the title of a music track to be recommended. The title registered in advance in the bulletin board server 32 is searched for and selected, instead of entering a character string.

In other words, the music recommender 12B enters at least one of an artist name, an album name, and a title (or part of the artist name, the album name, and the title) in a search word entry field 73, and operates a "search" button 74. Then, searching is performed for a database in the bulletin board server 32 using the characters entered in the search word entry field 73 as a search word. Then, a list of corresponding titles and relating information are displayed as a list 75. A "recommend" button 76 provided for the corresponding title in the list 75 is operated. Then, the bulletin board server 32 specifies the title, and internally establishes a link.

Accordingly, recommendation of a music track is completed, and the display screen for the topic shown in FIG. 2 is recovered. Since the post including the recommendation is made by the music recommender 12B, the comment 54 entered in the entry field 71, the "acquire" button 55, the "detail" button 56, and the "preview" button 57 are displayed, as in the case for the post 41, 42, or 45 shown in FIG. 2.

When a music track is recommended, a title of the music track is searched for and selected, as described above. This is because that content needs to be identified using an identification code and the like in order to perform management by internally associating the content database with a button on the electronic bulletin board. In addition, operations for displaying a "detail" button and a "preview" button next to the entry field 71 and for accessing digital audio data of a music track, independent of a comment, from a dedicated terminal can be facilitated.

In addition, a method for searching for and selecting the title of a music track is also effective in charging and counting the number of playbacks and the number of downloads. In addition, the title of a music track can be searched for and an internal link can be established in accordance with a procedure practically used in sites for Internet auction or shopping.

Furthermore, although the comment 54 is entered in the entry field 71 and the "post" button 72 is operated in the above example, if the display screen for the topic shown in FIG. 2 is recovered without entering a recommended music track, a post made at that time serves as a post made by a comment contributor. Thus, for example, only the comment 54 entered in the entry field 71 is displayed, as in the post 43 or 44 shown in FIG. 2.

A description content of a playlist and a method for describing the playlist are described next.

FIG. 6 shows an example of a method for describing a playlist. The playlist is structured in XML (extensible Markup Language) by poster information, comment content, recommended music track information, and the like in the topic on the electronic bulletin board.

The playlist is formed by a topic block and a playlist block. The topic block is a block mainly used for displaying a topic. The playlist block is used for displaying the topic and the playlist, and is used as a playlist in the personal computer 11.

Tags used in the playlist have meanings as described below.

A <topic> tag represents a detailed block of the topic.

A <title> tag represents the title of the topic. In the topic (shown in FIG. 2), in principle, the <title> tag indicates the title 50. In the playlist (shown in FIG. 3), in principle, the <title> tag indicates the playlist title.

A <comment> tag indicates a comment block. In the topic block, there is only one comment block for the post 40. In the playlist block, a comment block is formed for each post and is added to the end of the playlist block.

A <name> tag indicates the name of a user who writes the comment block. In the topic and the playlist, the <name> tag is displayed as the user name 51.

An <eva> tag indicates a rating for the user who writes the comment block. In the topic and the playlist, the <eva> tag is displayed as the rating 52.

A <date> tag indicates the date and time when the comment block is written. In the topic and the playlist, the <date> tag is displayed as the posted date and time 53.

A <body> tag indicates the text of the comment. In the topic and the playlist, the <body> tag is displayed as the comment 54.

A <playlist> tag indicates a playlist block.

A <rating> tag indicates a rating for the playlist provided by the present user. In the topic and the playlist, the <rating> tag is displayed as the number of stars.

A <recommend> tag indicates a URL (Uniform Resource Locator) for accessing digital audio data of a recommended music track. In the example shown in FIG. 1, the <recommend> tag indicates a directory in the content server 31 in which the digital audio data is stored. When the comment contributor 12C posts only the comment 54, the <recommend> tag is not included in the comment block. When a music track has already been downloaded, the <recommend> tag may be displayed as a local file path in the personal computer 11 or a music track ID (Identification).

A topic and a playlist are displayed using the tags described above, or a playlist for selecting a music track is formed using the tags described above.

A configuration example of a playback apparatus is described next.

Although a case where the personal computer 11 is used as a playback terminal has been described above, FIG. 7 shows a case where a dedicated portable terminal 100 is used.

Figure 7:
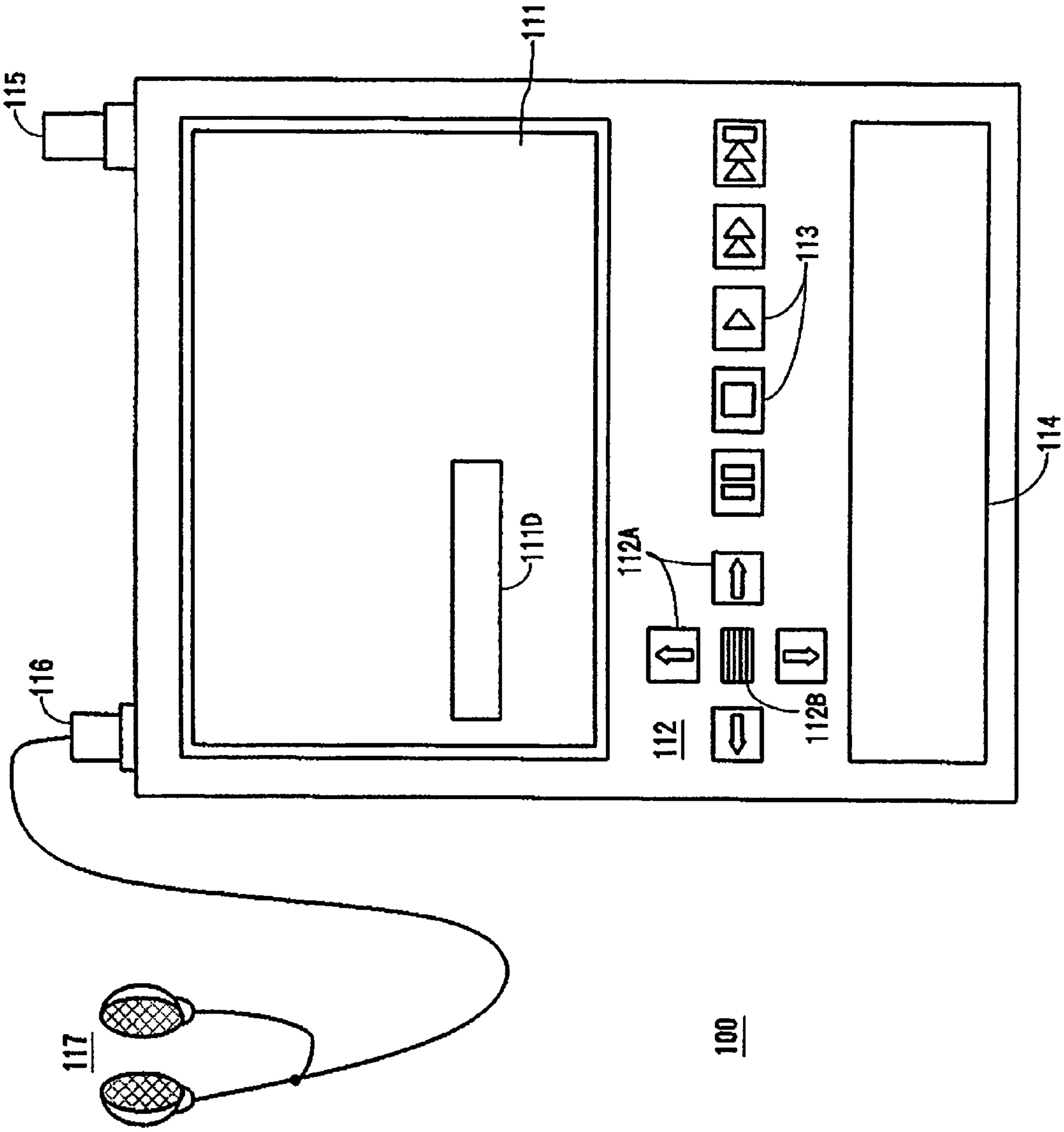
FIG. 7 is a front view showing the outer appearance of a portable terminal.

Referring to FIG. 7, the portable terminal 100 is configured as a flat rectangular parallelepiped. A display 111 is provided on the upper front face of the portable terminal 100. An operation key section 112, a mode key section 113, and an enter key 114 are provided below the display 111. The display 111 includes, for example, a color LCD (Liquid Crystal Display) panel. The display 111 is capable of displaying various characters (including numbers, symbols, and the like, which applies to the following description) in color by combination of dots. A playlist and the like are displayed on the display 111 when a music track is selected, and information on a music track is displayed on the display 111 during the playback of the music track.

The operation key section 112 functions as a pointing device. The operation key section 112 includes cursor keys 112A for moving a cursor 11D displayed on the display 111 in vertical and horizontal directions and a set key 112B for selecting or setting an item in the position of the cursor 111D. The mode key section 113 includes control keys, for example, for playing back a music track or stopping playback of the music track. The enter key 114 is used for entering characters, such as the comment 54.

In addition, an extensible antenna 115 and a headphone jack 116 are provided on the top of the portable terminal 100. The antenna 115 is provided for achieving wireless access to data in the content server 31 and the bulletin board server 32. A headphone 117 is connected to the headphone jack 116.

A circuit example of the portable terminal 100 is described next.

Figure 8:
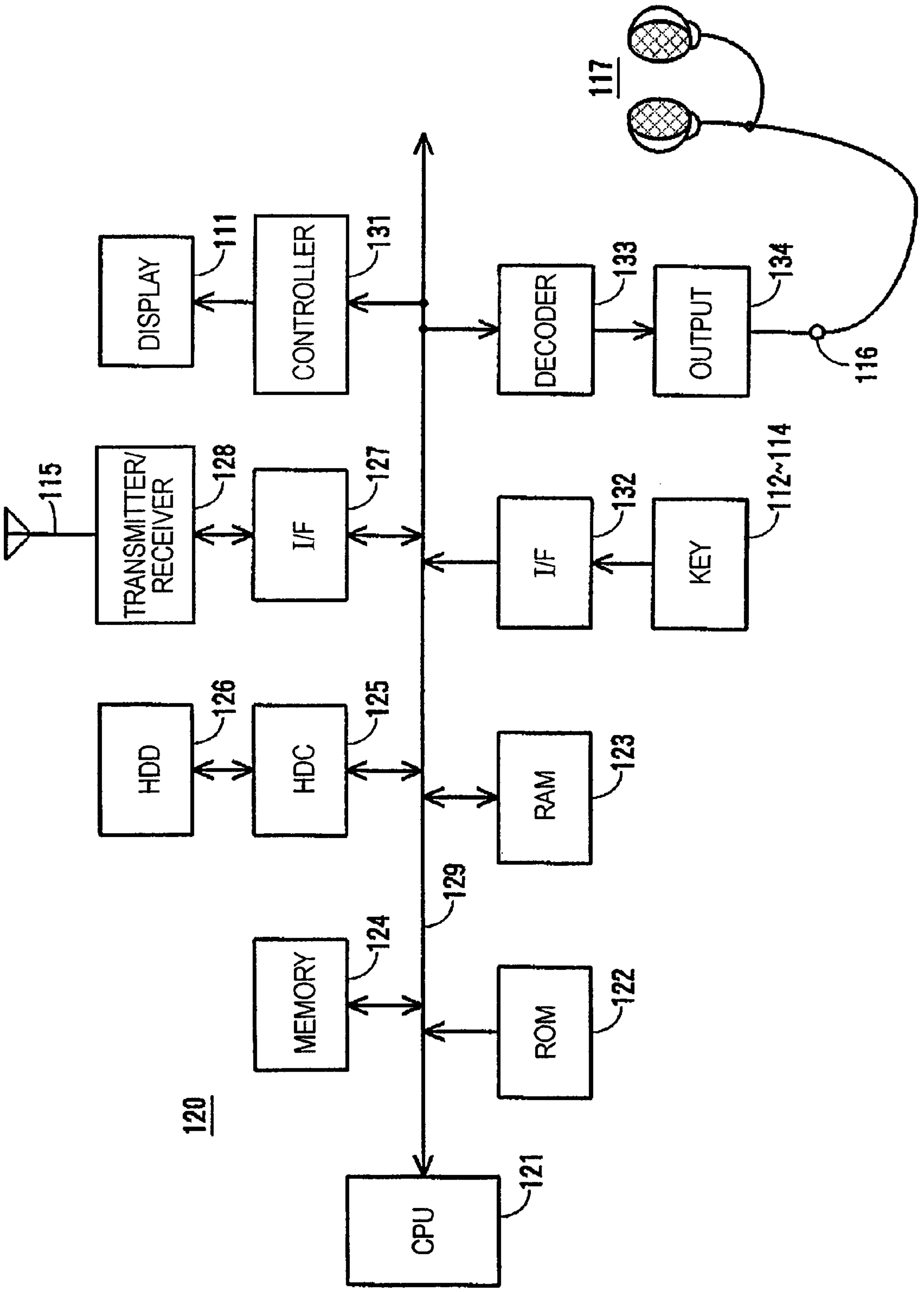
FIG. 8 is a schematic diagram showing the circuit structure of the portable terminal.

FIG. 8 shows an example of the circuit structure of the portable terminal 100. In this example, the portable terminal 100 has normal bus architecture, and a control circuit 120 is a microcomputer. In other words, a CPU (Central Processing Unit) 121 is connected to a bus 129, and a ROM (Read Only Memory) 122 in which various programs are written, a RAM (Random Access Memory) 123 used as a work area, and a nonvolatile memory 124, such as a flash memory, are connected to the bus 129.

In addition, in this example, a hard disk device 126 is provided as a mass storage device for storing music tracks. The hard disk device 126 is connected to the bus 129 via a hard disk controller 125. In this case, a music track is stored as digital audio data in the hard disk device 126. In this example, the digital audio data is encoded, for example, in the MP3 method for data compression. The hard disk controller 125 reads and writes the digital audio data from and to the hard disk device 126 in accordance with an instruction from the CPU 121.

In addition, a transmitter/receiver circuit 128 is connected to the bus 129 via an interface circuit 127. The transmitter/receiver circuit 128 is provided for wirelessly connecting the portable terminal 100 to the content server 31 and the bulletin board server 32 (or their access points) and for realizing downloading of digital audio data of a music track, reception of the digital audio data in the streaming method, downloading of a playlist, access to an electronic bulletin board, and the like. The antenna 115 is connected to the transmitter/receiver circuit 128.

In addition, the display 111 is connected to the bus 129 via a display controller 131, and the operation key section 112, the mode key section 113, and the enter key 114 are connected to the bus 129 via an interface circuit 132. In this case, when data for display is supplied from the CPU 121, the display controller 131 converts the data into a display signal and supplies the converted display signal to the display 111. Thus, characters corresponding to the data for display supplied from the CPU 121 are displayed on the display 111.

In addition, a decoder circuit 133 is connected to the bus 129, and the decoder circuit 133 is connected to the headphone jack 116 via an output circuit 134. The decoder circuit 133 is provided for decoding digital audio data in the MP3 method supplied to the decoder circuit 133 into original linear digital audio data and for supplying the linear digital audio data to the output circuit 134. The output circuit 134 includes a D/A (Digital to Analog) converter circuit and an output amplifier. The output circuit 134 converts the digital audio data supplied to the output circuit 134 into an analog audio signal, and outputs the analog audio signal to the headphone jack 116.

An operation of the portable terminal 100 is described next.

When a topic or a playlist is displayed, as shown in FIG. 2 or FIG. 3, a music track stored in the hard disk device 126 is searched for. When the music track included in the displayed topic or playlist is stored in the hard disk device 126, the "playback" button 57 is displayed.

When the "playback" button 57 is operated, digital audio data of the designated music track is read from the hard disk device 126 by the hard disk controller 125. The read digital audio data is supplied from the hard disk controller 125 to the decoder circuit 133 via the CPU 121, and decoded into original linear digital audio data.

The decoded digital audio data is converted into an analog audio signal in the output circuit 134, and the analog audio signal is supplied to the headphone 117 via the headphone jack 116. Thus, the music track stored in the hard disk device 126 can be listened to via the headphone 117. At that time, for music tracks stored in the hard disk device 126, from among music tracks included in the displayed playlist, selection and playback can skip by using the mode key section 113.

In contrast, when a topic or a playlist is displayed as shown in FIG. 2 or FIG. 3, if a music track included in the topic or the playlist is not stored in the hard disk device 126, the "preview" button 57 is displayed.

When the "preview" button 57 is operated, an instruction for preview of the corresponding music track is reported to the content server 31. Digital audio data of the music track is extracted from the content server 31, and wirelessly transmitted in the streaming method.

The transmission signal is received at the antenna 115, and supplied to the transmitter/receiver circuit 128. Digital audio data of the designated music track is output from the transmitter/receiver circuit 128. The digital audio data is supplied from the interface circuit 127 to the decoder circuit 133 via the CPU 121, and decoded into original linear digital audio data.

Thus, since the decoded digital audio data is converted into an analog audio signal in the output circuit 134 and the analog audio signal is supplied to the headphone 117, the music track stored in the content server 31 can be listened to via the headphone 117. In this case, only part of a target music track, for example, initial thirty seconds or a refrain part can be previewed. Thus, users are able to decide whether or not to purchase the music track.

When the music track is to be purchased, the "acquire" button 55 or the "purchase" button 65 is operated. Then, digital data of the music track having the title is downloaded from the content server 31, and stored into the hard disk device 126. A general method in practical use may be adopted as a method for user authentication and payment necessary for purchase.

Thus, in the subsequent stages, the "playback" button 57 shown in FIG. 2 or FIG. 3 is displayed. When playback of the music track is set, the music track stored in the hard disk device 126 is played back.

According to the personal computer 11 or the portable terminal 100, in order words, according to a playback terminal, for example, when a message "Tell me a good song for spending Christmas Eve with my girlfriend!" is posted, many others who read the message recommend music tracks with comments, and the recommendations and the comments serve as a playlist for the playback terminal. Thus, even a music track that a user does not know and that suits the mood and condition of the user can be registered in the playlist. In addition, the contents of the playlist dynamically change with time in accordance with posts on a topic, and new music tracks are added. Thus, the user does not lose interest in the playlist.

Furthermore, exchanging comments on a bulletin board system brings communication in new human relationships. Users are able to enjoy the benefits that are not provided by known players. For example, a user is able to listen to a music track recommended by a reliable person with ease or the user makes a friend with a recommender who recommends an unexpected music track.

In addition, users are able to feel the joy of receiving recommendation of music tracks from others. In addition, people who have a liking for music are able to be satisfied when others appreciate their recommendations. In addition, users are able to enjoy the unpredictability of registration of unknown music tracks in a playlist and are able to enjoy getting to know new music tracks.

In addition, a playlist that is not accessed can be weeded out by limiting the number of topics displayed on the electronic bulletin board 33 or by displaying popular topics determined in accordance with the number of downloads of a playlist in a top portion of the electronic bulletin board 33. Thus, the quality of the entire playlists improves, and user satisfaction also improves.

In addition, when a music track is being played back, a user is able to view posts made by recommenders or comment contributors for the music track. Thus, the user is able to enjoy new communication through music as well as playback of the music track. In addition, a new business model for music distribution can be created, and this stimulates the music industry itself. In addition, an affiliate system can be adopted for music recommenders. Thus, recommenders' motivation for recommending music tracks is improved, and the improvement in the motivation stimulates electronic bulletin boards. Thus, a culture based on electronic bulletin board playlists is created, and the music industry and the network business industry are stimulated.

In the above description, only limited members may be able to use the content server 31 and the bulletin board server 32. In addition, the content server 31 and the bulletin board server 32 may be configured on an intranet. In addition, although a case where sound content, such as a music track, is used is described in the foregoing embodiment, the present invention is also applicable to a case where video content, such as a moving image or a static image, is used or a case where a program or data in a database is used as content.

It should be understood by those skilled in the art that various modifications, combinations, sub-combinations and alterations may occur depending on design requirements and other factors insofar as they are within the scope of the appended claims or the equivalents thereof.

What is claimed is:

1. A playlist providing method comprising the steps of:

enabling a second user to post information on a topic in a second post when a first user introduces the topic in a first post under a predetermined title on an electronic bulletin board provided by an electronic bulletin board server, the electronic bulletin board being configured to display posts on the topic in a predetermined order, wherein the electronic bulletin board is further configured to enable users of the electronic bulletin board to request a copy of a playlist of recommended content tracks associated with the topic independently of purchasing one or more of the recommended content tracks on the playlist;

generating, by the electronic bulletin board server, the playlist of recommended content tracks for the topic based, at least in part, on the information included in the second post on the topic that includes at least one first identifier for at least one first recommended content track;

receiving, by the electronic bulletin board server, a third post including a second identifier for a second recommended content track for the topic;

dynamically updating the playlist to include the second recommended content track identified in the third post; and outputting the playlist via a network.

2. The playlist providing method according to claim 1, further comprising:

assigning rating information to the second user; and permitting the second post to be viewed if the rating information satisfies a predetermined threshold value.

3. The playlist providing method according to claim 2, wherein a third user who recommends content that is identical to the at least one first recommended content track and a post made by the third user are viewable.

4. The playlist providing method according to claim 2, wherein another topic including the at least one first recommended content track is viewable.

5. The playlist providing method according to claim 1, further comprising:

receiving, by the bulletin board server, a fourth post, wherein the fourth post includes a comment related to the topic without the at least one first identifier for the at least one first recommended content track for the topic.

6. The playlist providing method of claim 1, further comprising:

receiving a request for a copy of the playlist of recommended content tracks associated with the topic; and transmitting the copy of the playlist to at least one computer in response to receiving the request.

7. A content providing method comprising the steps of:

preparing, on a network, a bulletin board server that provides an electronic bulletin board configured to display posts on a plurality of topics in a predetermined order and a content server that accommodates content, wherein the electronic bulletin board is further configured to enable users of the electronic bulletin board to request a copy of a playlist of recommended content tracks for a topic of the plurality of topics independently of purchasing one or more of the recommended content tracks on the playlist;

enabling, by the bulletin board server, a second user to make a second post on the topic of the plurality of topics when a first user introduces the topic in a first post under a predetermined title on the electronic bulletin board;

generating the playlist of recommended content tracks for the topic based, at least in part, on the information included in the second post on the topic that includes at least one first identifier for at least one first recommended content track;

receiving, by the bulletin board server, a third post including a second identifier for a second recommended content track for the topic;

dynamically updating the playlist to include the second recommended content track identified in the third post;

outputting, by the bulletin board server, a list indicating recommended content as a playlist to an apparatus of a user who accesses via the network; and outputting, by the content server, designated content to the apparatus of the user to which the playlist is output when the content included in the playlist is designated.

8. The content providing method according to claim 7, wherein:

information on a rating is provided to the second user who made the second post; and whether the post on the topic is permitted to be viewed is set in accordance with the information on the rating provided to the second user who made the second post.

9. The content providing method according to claim 7, further comprising:

receiving, by the bulletin board server, a fourth post, wherein the fourth post includes a comment related to the topic without the at least one first identifier for the at least one first recommended content track for the topic.

10. The content providing method according to claim 7, further comprising:

receiving a request for a copy of the playlist of recommended content tracks associated with the topic; and transmitting the copy of the playlist to at least one computer in response to receiving the request.

11. A computer system, comprising:

an electronic bulletin board configured to:

receive a first post from a first user to introduce a topic to the electronic bulletin board;

receive a second post from a second user to recommend content related to the topic, wherein the second post comprises a first identifier of a first recommended music track;

display the first post and the second post on the electronic bulletin board in a predetermined order;

enable users of the electronic bulletin board to request a copy of a playlist of recommended content tracks associated with the topic independently of purchasing one or more of the recommended content tracks on the playlist;

generate the playlist of recommended content for the topic based, at least in part, on information included in the second post;

receive a third post, wherein the third post comprises a second identifier of a second recommended music track; and dynamically update the playlist to include the second recommended music track identified in the third post; and a content server configured to:

store a plurality of music tracks; and output via a network, music tracks listed on the playlist.

12. The computer system of claim 11, wherein the electronic bulletin board is further configured to:

determine a rating associated with each user of a post on the topic that includes a recommended music track; and include in the playlist, only recommended music tracks from posts by users having an associated rating above a predetermined threshold value.

13. The computer system of claim 11, further comprising:

a playback apparatus connected to the network, wherein the playback apparatus is configured to receive at least some of the music tracks listed on the playlist output by the content server.

14. The computer system of claim 13, wherein the playback apparatus comprises a display configured to display the playlist prior to receiving the at least some of the music tracks listed on the playlist from the content server.

15. The computer system according to claim 11, wherein the electronic bulletin board is further configured to:

receive a fourth post, wherein the fourth post includes a comment related to the topic without the first identifier for the first recommended music track.

16. The computer system according to claim 11, wherein the computer system is configured to receive a request for a copy of the playlist of recommended content tracks associated with the topic; and wherein the content server is configured to transmit the copy of the playlist to at least one computer in response to receiving the request.

* * * * *